Patented June 4, 1929.

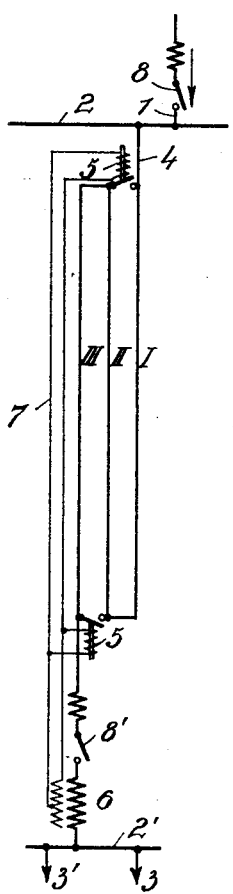
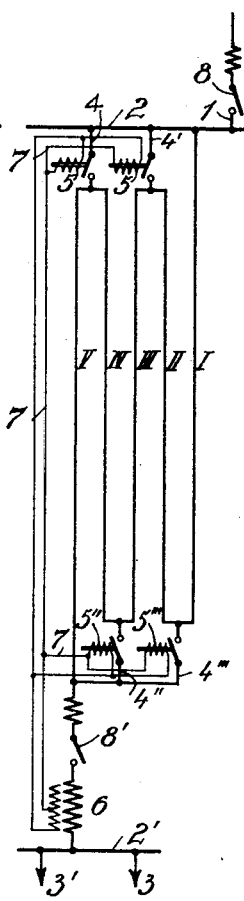
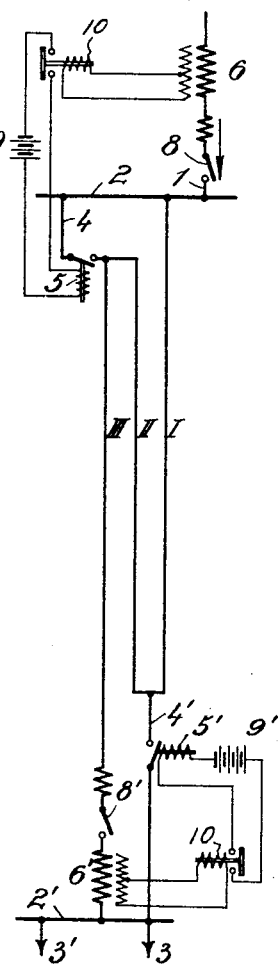

1,715,679

UNITED STATES PATENT OFFICE.

JOHANNES SESSINGHAUS, OF BERLIN-CHARLOTTENBURG, GERMANY, ASSIGNOR TO WESTINGHOUSE ELECTRIC & MANUFACTURING COMPANY, OF NEW YORK, N. Y., A CORPORATION.

PROTECTIVE SYSTEM FOR TRANSMISSION LINES.

Application filed March 27, 1925, Serial No. 18,793, and in Germany April 4, 1924.

My invention relates to protective systems for transmission lines and particularly to protective systems for short-circuits or other faults involving excessive currents.

An object of my invention is to provide means for limiting the short-circuit current to a safe value without introducing permanent impedances in the circuit or unduly complicating the distribution apparatus.

It is well known that short-circuits in electrical distribution systems which can not be entirely avoided render it necessary that the conductors and switching apparatus in the system be stronger electrically and mechanically than is necessary for the normal load current. The initial cost of an installation is therefore increased in order to provide the necessary strength and capacity in all the current-carrying elements thereof.

It has been proposed to insert impedances in the circuit in order to limit the short-circuit current, but such impedances are disadvantageous because the cost of the installation is increased, the installation is rendered more complicated and the impedances represent a constant energy loss, even under normal conditions.

In accordance with my invention, the system is simplified and normally no losses are incurred although ample protection is provided against short-circuits. My invention is applicable to feeders having considerable impedance, for example, by reason of their length and which are operated in parallel. If the current traversing the feeders exceeds a predetermined value, switches are automatically operated connecting the feeders in series relation thereby considerably increasing the impedance of the system. The operation of the switches is preferably effected by a current transformer in the feeder which is connected to an operating relay or coil of the switch.

For a better understanding of my invention, reference should be had to the accompanying drawings in which Fig. 1 is a diagrammatic view of an electrical distribution system embodying my invention;

Fig. 2 is a similar view of a modification thereof; and

Fig. 3 is a similar view of a modification in which no pilot-wire circuit is required.

Referring to Fig. 1, an electrical distribution system is shown comprising a feeder 1 from a generating station (not shown), supply and load busses 2 and 2' and a plurality of parallel feeders I, II, III extending between the busses. Although the feeders I, II, and III are shown as single lines, each line may represent the several conductors of a polyphase feeder in the case of an alternating-current system. The individual lines I and II are connected together at the first substation by a switch 5, and the conductors II and III are similarly connected through a second switch 5 at the second substation. All of the conductors are connected through a conductor 4 to the supply bus 2. The load is connected to the system through the conductors 3 and 3' connected to the load bus.

Normally, the lines I, II and III are connected in parallel relation between the load and supply busses. However, if the switches 5 are open, the several lines are connected in series relation between the busses. In order to control the switches 5, a current transformer 6 is connected in the circuit adjacent to the load bus so as to be energized in accordance with the load on the system. The secondary winding of the transformer 6 is connected through the pilot wire circuit 7 to the tripping coils of the switches 5. If desired, switches 8 and 8' may be provided as indicated to open the circuit between the generating station and the supply bus or between the supply and load busses. It is common to provide automatic switches at these points. Therefore, the detailed circuits of the switches are not shown.

If a short-circuit develops in the load circuit and excessive current traverses the system, the current transformer 6 opens the switches 5. The conductors I, II and III are then connected in series relation and limit the short-circuit current by reason of the impedance of the conductors. In the case of three conductors, as illustrated in Fig. 1, the impedance of the circuit is increased to nine times the original value. Consequently the short-circuit current is limited to a value approximating that of the normal load and the conductors of the circuit and the switch 8 need only have sufficient capacity for this current. In some cases the short-circuit current is so reduced that it is unnecessary to open the circuit by the operation of the switch 8. Therefore, the continuity of service of the system is improved.

The arrangement which I have described is simpler than the systems which have been proposed heretofore and has greater efficiency than a system using permanently connected reactors in the circuit. The principal economy, however, is obtained in the reduction of the dimensions and capacity of the switches, busses and line conductors which is accomplished. The first cost of the installation is greatly reduced.

As indicated in Fig. 2, the system is applicable to feeders having a greater number of parallel conductors than 3. For example, if there are five parallel conductors I, II, III, IV and V, two switches 5 are provided at each end of the feeders. These switches are all operated simultaneously in the case of a short-circuit, the operation being similar to that described above in connection with Fig. 1.

In the case of systems having long feeders, as indicated in Fig. 3, the pilot-wire circuit may be eliminated in order to decrease the cost of the system. Referring to Fig. 3, conductors I, II and III are connected to the busses 2 and 2' in normally parallel relation. Switches 5 and 5' are disposed in the conductor circuits to alter the normal parallel-connected relation to a series connection, as is obvious from the drawing.

The switch 5 at the supply end of the conductors is actuated, upon the occurrence of an overload, by means of a circuit including a battery 9, or other suitable source of electromotive force, and the contacts of a relay 10. The winding of the relay 10 may be energized, from a transformer 6 associated with the supply conductor, in accordance with the power traversing said conductor.

Similarly, at the load end of the conductors I, II and III, the switch 5' is actuated by means of a battery 9 and is controlled by a relay 10 which is energized from a transformer 6 associated with one of the parallel conductors.

The operation of this modification of the invention is similar to that above described, but this modification is peculiarly adapted for installations wherein the lengths of the conductors I, II and III are such that the use of pilot-wire control circuits is undesirable from a cost standpoint.

Quite obviously, various other modifications may be made in my invention without departing from the spirit and scope thereof, and I desire, therefore, that only such limitations shall be placed thereon as are disclosed by the prior art and set forth in the appended claims.

I claim as my invention:

1. A protective system for transmission lines normally operating in parallel relation comprising switching means for connecting the lines in series relation and means for operating the switching means in response to abnormal electrical conditions.

2. In an electrical distribution system, a plurality of parallel transmission conductors, means for connecting said conductors to the system to carry the load current in parallel and means responsive to an excessive current to reconnect said conductors in series relation to limit the flow of current by the series impedance thereof.

3. In an electrical distribution system, a supply bus, a remote load bus, a plurality of transmission conductors connecting said busses, switching means for connecting said conductors in series or parallel relation and means including a current transformer adjacent said load bus for controlling said switching means upon the occurrence of predetermined electrical conditions.

4. In an electrical distribution system, a supply bus, a remote load bus, a plurality of transmission conductors connecting said busses, switching means adjacent each bus for connecting said conductors in series or parallel relation, a current transformer adjacent each bus and means including said transformers for controlling the switching means upon the occurrence of predetermined conditions.

In testimony whereof I affix my signature.

JOHANNES SESSINGHAUS.